United States Patent
Trulson et al.

[11] 3,977,967
[45] Aug. 31, 1976

[54] ULTRAFILTRATION APPARATUS AND PROCESS FOR THE TREATMENT OF LIQUIDS

[75] Inventors: Olof Conrad Trulson, Chappaqua; Lawrence Marvin Litz, Pleasantville, both of N.Y.

[73] Assignee: Union Carbide Corporation, New York, N.Y.

[22] Filed: Dec. 13, 1974

[21] Appl. No.: 532,683

Related U.S. Application Data

[63] Continuation of Ser. No. 358,943, May 10, 1973, abandoned.

[52] U.S. Cl. ............................ 210/23 F; 210/433 M; 210/500 M
[51] Int. Cl.² ......................................... B01D 13/00
[58] Field of Search ............ 210/23, 321, 500, 570, 210/433 M

[56] References Cited
UNITED STATES PATENTS

| | | | |
|---|---|---|---|
| 3,022,187 | 2/1962 | Eyraud et al. | 210/500 X |
| 3,246,764 | 4/1966 | McCormack | 210/321 |
| 3,449,245 | 6/1969 | Johnson et al. | 210/321 X |
| 3,457,170 | 7/1969 | Havens | 210/321 X |
| 3,462,362 | 8/1969 | Kollsman | 210/321 X |
| 3,497,394 | 2/1970 | Berger | 210/510 X |
| 3,542,204 | 11/1970 | Clark | 210/321 |

*Primary Examiner*—Frank A. Spear, Jr.
*Attorney, Agent, or Firm*—William Raymond Moran

[57] ABSTRACT

An apparatus and process are provided for the concentration and separation of components contained in liquids. The apparatus is comprised of, in part, a module containing a plurality of axially aligned, hollow tubular members having a well defined porosity and a substantially uniform, continuous, adherent, porous coating of preformed, aggregated, inorganic metal oxide particles on their interior or exterior surface. The low molecular weight dissolved phases permeate the walls of the tubes while the larger diameter molecules are retained in the liquid. The apparatus can be operated for long periods of time with a high degree of concentration and separation of liquids. The apparatus is particularly suited for the concentration and separation of oil from mixtures of oil, water and detergents. It is also useful in textile, paper making and food industries.

48 Claims, 8 Drawing Figures

ULTRAFILTRATION APPARATUS AND PROCESS FOR THE TREATMENT OF LIQUIDS

This is a continuation, of application Ser. No. 358,943 filed May 10, 1973, now abandoned.

This invention relates in general to an ultrafiltration apparatus and process for the treatment of liquids. In another aspect, this invention is directed to an apparatus and a process for the concentration and separation of components contained in liquids. In a further aspect, this invention is directed to a process for the treatment of chemically stabilized emulsified oils and other liquids containing large diameter molecules.

In recent years a variety of processes have been disclosed in the literature relating to ultrafiltration techniques. A majority of work in the ultrafiltration area was developed at the Oak Ridge National Laboratories of the United States Atomic Energy Commission where extensive studies of ultrafiltration, or cross-flow filtration, as it is sometimes called, have been carried out. The work there was primarily concerned with high pressure (500–950 psi) systems using porous tubular support structures of carbon or alumino-silicates or a microporous membrane on a perforated stainless steel sleeve.

The investigators at Oak Ridge found that for some aqueous systems, a bed of particles uniformly dispersed onto a porous substrate functions as an efficient filter medium which rejects the passage of particles and molecules whose size exceed the openings between adjacent particles in the porous bed. It was suggested that the particles deposited on the substrate surface may be of any material inert to the solutions in contact with the surface. A variety of materials such as diatomaceous earth, perlite, asbestos fibers, cellulose fibers, dried silica gel, and carbon have been used.

In other experiments at Oak Ridge it was shown that colloidal hydrous oxides may be used as permeation barriers for the hyperfiltration in reverse osmosis treatment of solutions, thereby concentrating still lower molecular weight solutes in water, provided that the aqueous solution is pumped over the surface of the permeable membrane under high pressure (50–1000 psi). In this case the colloids are formed from polyvalent metal salts by heating an aqueous solution of the salt until a turbid solution is obtained. To form the membrane, small concentrations of the turbid solution (greater than 10 ppm) are circulated over the support structure at moderate velocity and at pressure. This procedure results in the formation of a thin boundary layer (thickness up to 0.05 millimeters) which serves as an interface between the waste solution and the porous substrate. (See, for example, U.S. Pat. Nos. 3,413,219; 3,449,245; and 3,537,988).

It is indicated in U.S. Pat. No. 3,413,219 at column 2, lines 43 et seq., that membranes formed from the colloidal hydrous oxides will continue to have rejecting properties for a day or more, though rejection gradually decreases. However, it is indicated that the continued presence of an additive in the solution will improve the rejection properties and repair defects which might occur in the membrane. In addition to the necessity for the continued presence of an additive to maintain the desired properties, it has also been found that many of the prior art methods are useful only for the treatment of certain types of liquids. For example, prior to the present invention no completely satisfactory method was available for the treatment of liquids such as those containing chemically stabilized emulsified oils. Thus, while the prior art discloses a variety of ultrafiltraton methods, to date no completely satisfactory method has been provided which avoids or minimizes many of the difficulties inherent with such processes.

Accordingly, one or more of the following objects will be achieved by the practice of this invention. It is an object of this invention to provide an ultrafiltration apparatus which is useful for the separation and concentration of components contained in liquids. Another object of this invention is to provide an ultrafiltration apparatus which is useful for the separation and concentration of waste liquids from industrial processes. A further object is to provide a novel, economical and continuous ultrafiltration process for the separation and concentration of liquids containing molecules of a relatively large diameter from those of a relatively small diameter. Another object is to provide a process for the separation of large, dissolved polymeric molecules, such as proteins from solutions. A further object of this invention is to provide an ultrafiltration apparatus which is useful for separating emulsified oil, dirt and various other suspended materials from solutions. Another object is to provide a process for the concentration and separation of components contained in textile mill liquids. A still further object is to provide a process for the separation and concentration of polyvinyl alcohol from textile mill liquids. A still further object is to provide a process for the separation and concentration of materials employed in processing paper pulp. A further object is to provide a process for the separation of materials employed in electropaint primer operations.

Another object of this invention is to provide a process for coating the surfaces of the tubular members contained in the ultrafiltration module. A still further object is to provide a process for coating the inner surfaces of carbon tubes with a preformed metal oxide. Another object is to provide a process for coating the inner surfaces of carbon tubes with zirconia. A further object is to provide a process for coating the outer surface of carbon tubes with a preformed metal oxide. Another object is to provide a process for coating the A further object is to provide a process for sealing the tubular members in the ultrafiltration module. These and other objects will readily become apparent to those skilled in the art in the light of the teachings herein set forth.

In its broad aspect, this invention is directed to an ultrafiltration apparatus and a process for the treatment of liquids. The apparatus is comprised of, in combination:

a. at least one module having:
 i. at least one entrance port,
 ii. at least one exit port,
 iii. a permeate collection zone having at least one exit port
 iv. a multiplicity of axially aligned hollow tubular members disposed in the zone in close proximity to one another, said members having a pore volume of at least about 0.08 cc/gm in the distribution peak in the pore diameter range wherein the majority of the pores are from about 0.1 to about 2.0 microns in diameter, the members being supported and sealably mounted in the zone so that fluid entering the module must contact the members and any components of the fluid which permeate the walls of the members collect in the permeate zone, and v. contained on one selected surface of the members a substantialy uniform, continuous, adherent porous coating of preformed, aggregated metal oxide particles having an average mean size of less than about 5.0 microns, and a coating of from about 0.01 to about 10.0 microns in thickness without substantial penetration into the members of more than about 5.0 micron.

b. means for supplying a feed liquid to the module,
c. means for withdrawing a concentrated liquid from the module, and
d. means for withdrawing permeate liquid from the permeate collection zone.

The objects of the invention and the preferred embodiments thereof will best be understood by reference to the ultrafiltration drawings.

Figure 1:
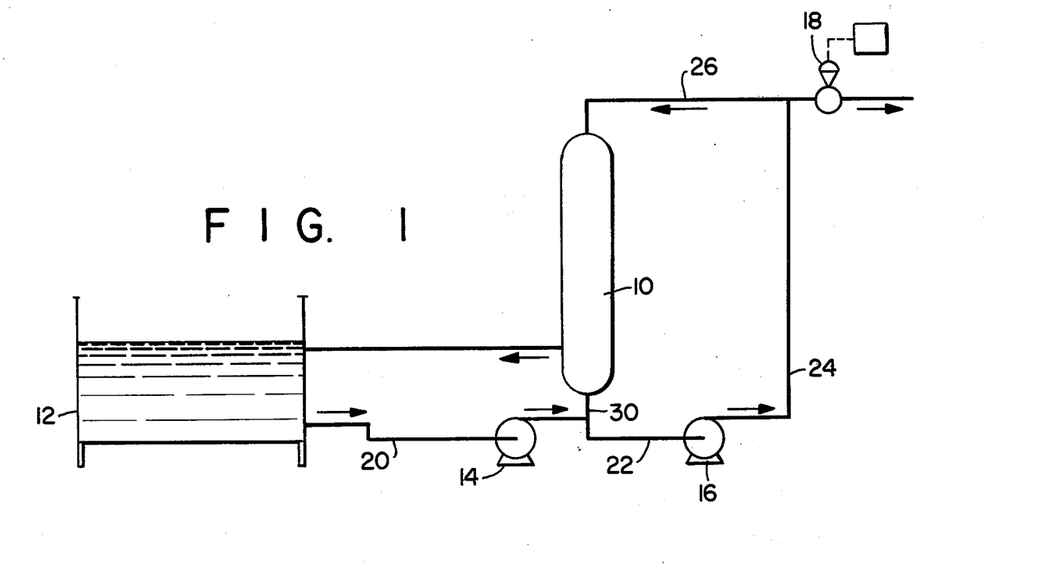
FIG. 1 illustrates one form of the ultrafiltration system of this invention.

With reference to the drawings, the ultrafiltration system of this invention as shown in FIG. 1 is comprised of the ultrafiltration module 10, a tank 12, pumps 14 and 16, and valve control means 18. The liquid to be concentrated and separated is pumped from tank 12 via conduits 20, 22, 24 and 26 into the ultrafiltration module 10. AS shown in the cut-away view of FIG. 2 module 10 is comprised of a plurality of closely packed tubes 32 which are held in place at each end by tube sheets 34 and 36. The tubes are positioned in the module in such a manner that liquid entering the module via conduit 26 must pass through the tubes. The liquid and low molecular weight dissolved phases, i.e., small diameter molecules, permeate the walls of the tubes into chamber 38 and pass out via conduit 28. The high molecular weight dissolved phases, i.e., large diameter molecules, as well as any non-dissolved material pass out through conduit 30.

Figure 3:
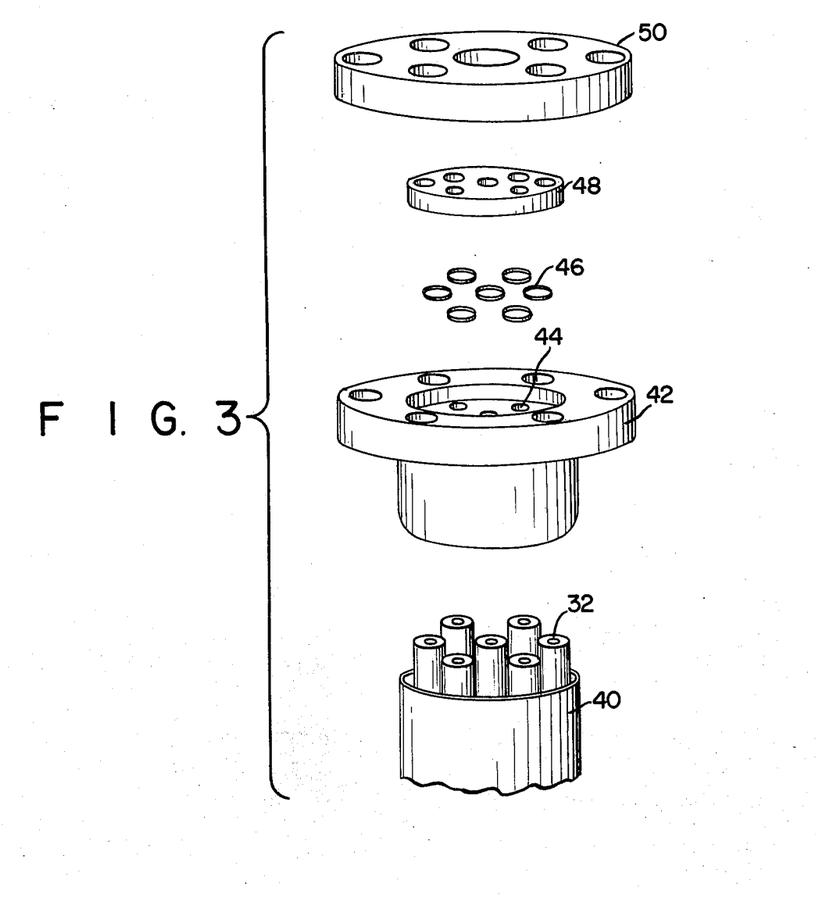
FIGS. 3–6 show methods for assembling the tubular ultrafiltration module.

FIG. 3 shows one means for positioning tubes 32 in the module shell 40. Tube sheet 42 has a plurality of openings 44 of sufficient diameter to receive the ends of the tubes. O-rings 46 are then inserted over the ends of the tubes and plate 48 positioned over the tube ends. Cap 50 is then affixed to the tube sheet 42 compressing the O-rings to form a tight seal.

Figure 4:
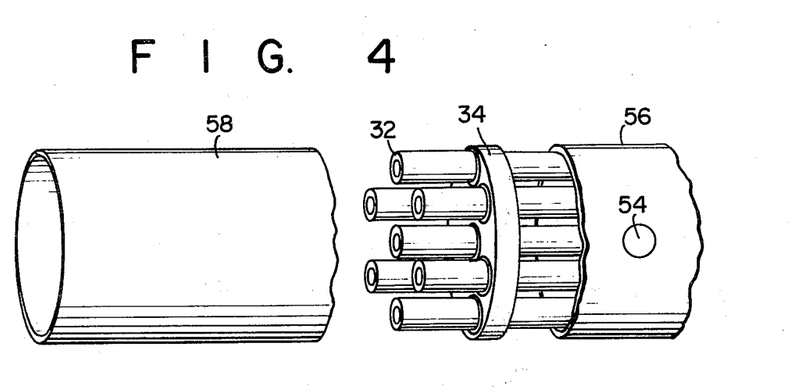
Figure 5:
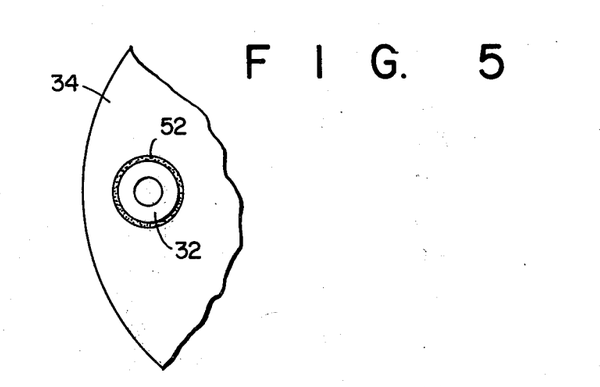
Figure 6:
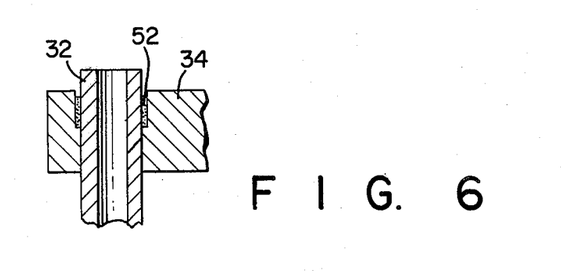

FIGS. 4, 5 and 6 show another method for positioning the tubes 32 in the module shell. The tube sheet 34 has openings through which the tubes 32 can be inserted. The outer side of the tube sheet has openings of greater diameter than the tubes which provides a recess for gasket seal 52 which can be composed of rubber or rubber-like material. The module shell 56 containing the tubes 32 and equipped with a permeate port 54 is shown in FIG. 4 with a portion of its end 58 removed to view the interior.

Figure 7:
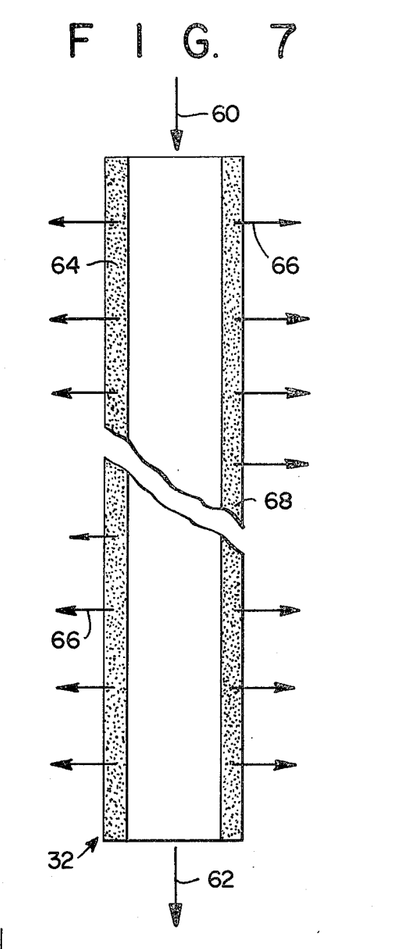
FIG. 7 is a drawing depicting a longitudinal, cross-sectional view of one of the hollow tubular members.

FIG. 7 illustrates a cross-sectional view taken longitudinally along the axis of one of the hollow tubular members 32. Feed liquid enters at location 60, passes through the tubular member 32 and exists at location 62. The low molecular weight dissolved phases permeate the walls 64 of the tubular member into permeation zone 66.

Figure 8:
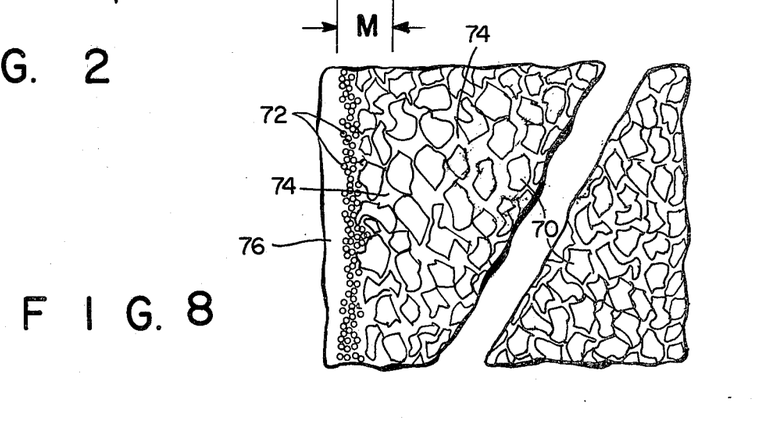
FIG. 8 depicts an enlarged view of a portion of the cross-sectional view showing the porous substrate and metal oxide coating.

FIG. 8 illustrates an enlarged cross-sectional view, approximately 2000 ×, of a portion of the tubular member 32 taken, for example, at location 68. The tubular member 32, for example a carbon tube, is composed of bonded carbon particles 70 and has essentially continuous coating of aggregated metal oxide particles 72. The particles 72 only partially penetrate into pores 74 which pores are characteristic of the carbon tubes employed in this invention. invention. The aggregated metal oxide particles typically penetrate to a depth M. of no more than about 5.0 micron. The pores below about 0.05 micron in diameter are essentially free of the metal oxide coatings. When in use a filter cake 76 composed of higher molecular weight dissolved phases, i.e., large diameter molecules or undissolved particles may form on the coated surface.

Figure 2:
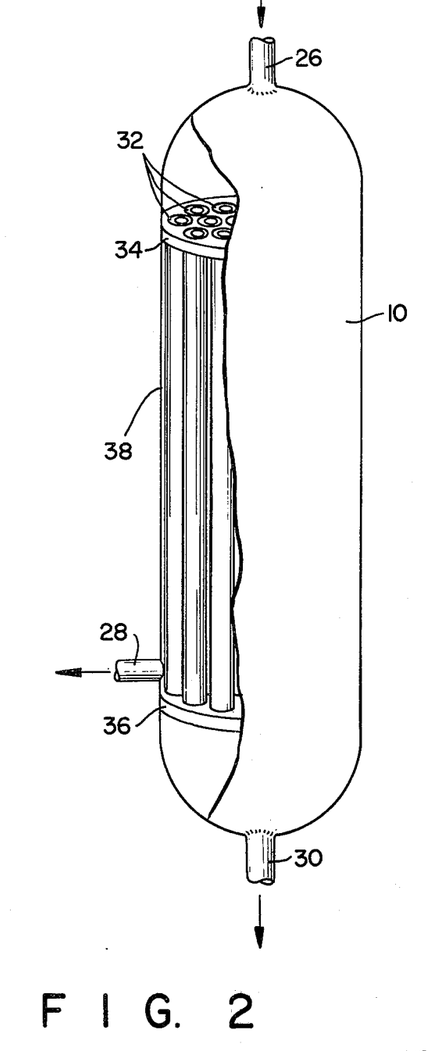
FIG. 2 shows a cut away view of the multi-tube ultrafiltration module.

The module of the apparatus can be designed and assembled in such a manner that the metal oxide coating can be either on the inner hollow interior surface or on the outer surface of the tubular members. In either case, the coating of metal oxide particles is on that surface of the tubular member which is in direct contact with the feed liquid. For example, if the module is designed as shown in FIG. 2 where the feed liquid enters through conduit 26 and leaves at conduit 30, the metal oxide coating is on the hollow interior of the tubular members. If the coating is on the outer surface of the tubular members, then the feed liquid would enter through conduit 28, contact the outer surface of the tubular members and exit from module 10 through a conduit not shown in FIG. 2. The permeate which passed through the walls of the tubular members could then be withdrawn through conduit 30.

Of the two types of modules, the one shown in FIG. 2 is preferred, because of enhanced hydrodynamic characteristics compared to the arrangement where the feed liquid contacts the outer surface of the members. The feed fluid passes through the inner hollow portion of the tubular members and the permeate collects in the permeate zone and can be withdrawn through conduit 28.

As hereinbefore indicated the apparatus of this invention is ideally suited for operation over extended periods of time with a high degree of concentration and separation of components contained in liquids. In contrast to many of the ultrafiltration units currently available, the apparatus of this invention maintains a high level of throughput without the need for additives.

As previously mentioned the apparatus of this invention is comprised of an ultrafiltration module together with means for supplying feed liquid and means for collecting and withdrawings a concentrate liquid and a permeate liquid. The module itself is comprised of a multiplicity of axially aligned hollow tubular members disposed in the permeate collection zone of the module. As set forth in FIG. 2 the tubular members 32 are aligned in a parallel fashion and supported and sealably mounted in place by tube sheets 34 and 36. Although the tubular members can be fabricated from a variety of material, it is preferred that they be largely inorganic in composition. It has been observed that tubular members composed of inorganic materials are more resistant to abrasion and can withstand higher temperatures than those largely composed of organic materials. In practice, it has been found that tubular members composed of carbon, alumina, alumino silicate, and the like, can be utilized in the apparatus of this invention.

It is critical for the successful practice of this invention that the tubular members have a well defined porosity. If the pore diameter is too large separation will not be selective and the inner pores may even become blocked by the larger diameter molecules. If the pore diameter is too small the rate at which liquid passes to the permeate collection zone will be greatly reduced and thus the overall efficiency of the apparatus lowered.

It has been found that tubular members which are characterized by a pore volume of at least about 0.08 cc/gm in the distribution peak in the pore diameter range wherein the majority of the pores are from about 0.1 to about 2.0 microns in diameter, are ideally suited for use in the ultrafiltration apparatus. Particularly preferred are tubular members composed of carbon and which have the majority of pore diameters within the above range. Pore size measurements on samples of carbon tubes employed in the modules indicate that they are sharply peaked in the range of 0.10=0.50 microns. Pores in this size range account for nearly 50 per cent of the distribution throughout the tube. The preferred tubular members are fabricated by a binder-coking process followed by a subsequent heat treatent. The carbon tubes employed are known in the art, for example, those normally used for the fabrication of commercial cored arc carbons for motion picture projection machines. The carbon tubes serve as the outer shell which is subsequently filled with graphite and rare earth oxides to provide the desired light intensity.

The size of the tubular members and the length to diameter ratio can vary over a wide range. The particular size chosen will undoubtedly be influenced by the overall size of the module as well as the type of liquid and components to be separated. In practice, however, tubular members having an internal diameter of from about 0.01 inch to about 1.0 inch and a wall thickness of from about 0.03 to about 0.25 inch and a length of about 48 inches have been employed with excellent results. Tubular members having an internal diameter of 0.25 inch, a wall thickness of about 0.06 inch and a length of about 48 inches are particularly preferred.

In addition to the well defined porosity of the tubular members, it has been found that optimum ultrafiltration can be achieved if the inner surface of the porous tubular members is coated wth certain aggregated metal oxide particles as hereinafter defined. the ultilization of a selected size range, metal oxide coating represents a significant improvement over the prior art with respect to the development of a microporous ultrafiltration filter for cross-flow filtration. Based upon the use of carbon, alumina or other porous tubular members as substrate materials, with the addition of aggregated metal oxide particles, i.e., a microporous metal oxide coating, it has been discovered that several different industrial process and waste streams can be treated in which suspended solids, collids, oils, or high molecular weight polymers are separated by ultrafiltration at rates several times higher than the bare tube or the previously preferred hydrous zirconia oxide membrane of the prior art.

The present invention utilizes as the coating aggregated metal oxide particles having a narrow size range below about 5 microns and largely between about 0.1 and about 2.0 microns. The aggregated particles can be further sized and classified as fine (less than 0.1 microns), medium (0.1 to 1.0 micron) and coarse (1.0 micron and larger). Particularly preferred are aggregated metal oxide particles wherein a sizeable portion, i.e., at least about 50 per cent, is from about 0.1 to about 1.0 microns in size.

Although commercially available metal oxides powders can be employed, in some instances they may require prolonged grinding times to reduce the particle size to the proper range. Particularly preferred metal oxide powders which have been found to be ideally suited for use in this invention are those prepared by the so called precursor process. This process comprises first contacting a metal compound with a carbohydrate material, igniting the material to decompose and remove the carbohydrate material and to insure conversion of substantially all of said metal compound to fragile agglomerates of its metal oxide, followed by comminution of the thus formed agglomerates to give the finer microporous aggregated particle employed in the invention.

For example, a supply of the metal oxide powder aggregate, prepared by the precursor process, such as zirconia containing about 8 to 10 per cent yttria, can be ball milled by placing 1500 grams in a one gallon container and adding zirconia beads. The container is then filled about three-quarters full with deionized water and acidified to a pH of 4 with acetic acid. Thereafter, the contents are milled for about 18 hours.

The particles prepared by the precursor process are so small that settling rates are slow, thus aggregates which have not been completely disrupted during wet ball milling can be separated from dispersed suspension of liberated particles by sedimentation, centrifugation, or other separation procedures based on particle size or mass. For example, sizing can be effected by centrifuging from a broad distribution of particles sizes to obtain aggregated metal oxide particles largely within the desired range as hereinafter indicated. Once the separation has been made, the liberated particles remaining in suspension can be conveniently collected by treatments that reduce the surface charge and render the colloidal suspension unstable. Typical treatments are the addition of an acid to lower the pH of the suspension, or the addition of a salt having a multivalentanion. The suspensions treated in this manner revert to a flocculated condition, and in this form, the powder can be separated from the bulk of the suspending medium by filtration or sedimentation.

It has been observed that the mean individual particle size from which the preferred 0.1 to 1.0 micron aggregates are obtained, is below 1.0 micron, and usually below 0.1 micron. The individual particles remain unresolved at 11,000 magnification. X-ray powder diffraction analysis indicates an ultimate particle size within the range of from about 0.01 to about 0.1 microns.

A variety of metal oxide particles can be employed as the coating in this invention. For example, the metal of the metal oxide can, either singly or in mixtures thereof, include beryllium, magnesium, calcium, aluminum, titanium, strontium, yttrium, lanthanum, zirconium, hafnium, thorium, iron, manganese, silicon, and the like.

When the metal oxide powder employed is zirconia, in many cases it is preferred to produce the zirconia powder in a stabilized form. Therefore, a compound of yttrium, calcium, magnesium rare earth metal or other known metal that forms a stabilizer oxide can be employed along with the zirconium containing compound in producing the loaded material. The proportions of the zirconium compound and stabilizer metal compound should be selected to produce the type of stabilized zirconia desired.

A further and more detailed description of the precursor process for making the metal oxide powders employed in the present invention is set forth in Belgian Pat. No. 766,962 entitled "Finely Divided Metal Oxides and Sintered Objects Therefrom" by B. H. Hamling and A. W. Naumann.

In practice, the metal oxide coating is applied to the tubular members by circulating and aqueous suspension of the aggregated particles through the tubes at linear flow velocities of from about 0.5 feet per second to about 40 feet per second, and at pressures from 30 to 500 psi. The concentration of aggregated particles in the suspension typically ranges from about 10 to about 100 milligrams per liter. The suspension is generally maintained at a pH sufficient to maintain a stable suspension of the aggregates. As the water filters through the pores of the tubes, the particles are filtered out and cover the pore opening of the substrate with a very fine pored layer. It is this uniform, continuous, highly porous, very fine pore structure which provides the higher throughput and improved resistance to fouling as compared to either bare tubes or tubes coated with less porous materials. For optimum efficiency and throughput, it has been found that the coating should be from about 0.01 to about 10.0 microns in thickness without substantial penetration into the tubular member of more than about 5.0 microns. It is also desirable but not necessary to coat the tubular members at pressures at least equal to, and at flow rates no greater than, those which will be employed when the module is in operation.

For most applications the tubular members are coated with the aggregated metal oxide particles to provide an average coating of about 8.5 milligrams per square inch of the surface of the tubular member. For certain applications it may be desirable to add a second coating on top of the first of the fine size particles.

For the majority of applications, it has been found that a level of about 1 milligram of aggregated metal oxide particles per square inch tube surface is the minimum amount that should be applied. Higher amounts yield higher and more stable flux levels. For example, while an average metal oxide coating of 8.5 milligrams is useful, it may be desirable to coat as much as 30 milligrams per square inch.

The coating of the tubular members with the metal oxides preferably is effected within a selected pH range. The particular pH range chosen is that range in which the metal oxide particles remain in suspension. For example, when the tubular members are coated with zirconia particles, the preferred pH range is from about 1 to about 5 and more preferably from about 2 to about 3.5. Adjustment of the pH can be accomplished by the addition of an acid such as acetic, oxalic, hydrochloric and the like. In practice, oxalic acid or hydrochloric acid is preferred since it tends to keep in solution any iron which might be present.

It should be noted that in contrast to methods disclosed in the prior art, it is not necessary to form a colloid before depositing the metal oxide on the surface of the tubular member such as is disclosed for the hydrous zirconia gel U.S. Pat. No. (3,413,219). The metal oxide aggregates are preformed and separated into the proper particle size range prior to the coating step. The coating is mainly a mechanical step with the metal oxide aggregates penetrating to a degree the pores of the tubular members and building up the desired coating on the surface. The aggregated metal oxide particles do not fill the pores of the tubular members in the sense that they are plugged, but bridge the pores which permits the small diameter molecules of the feed stream to pass through at a high rate.

As previously indicated the ultrafiltration apparatus of this invention can operate efficiently at pressures of about 500 psi and lower. Various factors such as temperature, pressure and flow velocities, will, of course, vary depending upon the particular feed stream. Additionally, the actual geometric configuration of the interior of the tubular members will also be a factor. For example, the interior of the members need not be cylindrical but can be star-shaped, hexagonal, octagonal, saw tooth, or the like.

It has been found that for the concentration and separation of certain dissolved phases, optimum results are obtained if the hollow tubular members containing the metal oxide coating are covered with an additional coating, such as for example, the fine grade of metal oxide powder (<0.1 microns) or a hydrous zirconia gel. Method for applying hydrous zirconia gel coating are known in the art and are disclosed, for example, in U.S. Pat. No. 3,537,988.

It should be noted that such coatings are in addition to the metal oxide coating. Attempted use of the hydrous zirconia gels alone on the tubular members does not provide the high degree of concentration and separation as in the present invention. For instance, examples 4 and 5 of this invention are directed to the use of the ultrafiltration apparatus for the concentration of polyvinyl alcohol in a textile liquids. As indicated in Table V of example 5 both the metal oxide coated carbon tube and the tubes having an addition hydrous metal oxide coating gave markedly improved results over the uncoated carbon tube.

As illustrated in FIG. 8, when in operation a filter cake composed of the larger diameter molecules as well as solid or suspended matter in the feed liquid will form initially on the coated tubular members. When the ultrafiltration apparatus is in operation, the feed stream, such as an aqueous oil emulsion, is fed, under pressure, over the filter surface at velocities high enough to shear away most of the accumulated filtered substances. Since this flow is perpendicular to the direction of flow of the filtered liquid through the filtering surface, the term cross-flow filtration is employed. It is important that the flow rate through the tubular members be such that turbulent conditions are achieved. The liquid should pass through the tubular members at a rate of at least about 1.0 linear feet per second and at a Reynolds Number of at least about 2000.

For instance, an ultrafiltration apparatus containing a single module with approximately 151 tubular members (0.25 inch internal diameter and 48 inches in length) can process over 3,000 gallons per day at a pressure of 100 psi and a feed stream temperature of about 72° F. When two or more modules are employed in the same apparatus, or when the number of tubular members is increased, volumes as large as tens of thousands of gallons per day, and higher, can be processed efficiently.

In conventional filtration the filtered material would build up as thick filter cake which greatly reduces the filtration rate. Depending on the geometry of the system and the type of material being filtered, the velocities parallel to the filtering surface may be from about 0.5 to about 40 feet per second. A most significant feature of the present process is that the filter interface is such that dissolved, colloidal or suspended particles of the feed liquid in the size range of 10 microns and higher to as low as 0.002 microns may be removed at filtration rates through the surface as high as several hundred gallons per day per square foot at pressures of 100 psi or lower.

Whereas ultrafiltration has been used for the removal of suspensions, colloids and high molecular weight materials dissolved in aqueous solutions, the discovery that oil emulsions could be concentrated and separated from the bulk aqueous phase by ultrafiltration through coated fine pored tubes was unexpected. Such oil emulsions are, for example, those used in the preparation of steel and rolling mill coolants and lubricants or such emulsions as used in cutting, drawing, stamping, or other metal-working operations. In addition, the types of oil-water-dirt-metal chip emulsions obtained in the detergent washing of fabricated metal parts, etc., may also be separated into a concentrated oil-dirt-particle retentate solution plus a clear water plus soluble detergent filtrate phase.

At present, accumulations of oil, dirt and various other suspended solids in an aqueous system are removed by additions of acid and/or other chemicals at relatively high temperatures to break the emulsion and separate the oil from the suspension; the water is then settled in large storage tanks to remove particulate matter and the remaining soluble components are either neutralized or otherwise chemically treated by additions of acid or alkali and then directed to a sewer or transported to a suitable dumping or processing site. Transportation is relatively costly and in no cases are water soluble components of the waste water separated cleanly for recycling. Further, the costs of the processing with chemicals are substantial, both for materials and labor as well as for the processing facilities. Sewer surcharges for the chemical laden water phase are often quite high. In an increasing number of localities, such discharges are being prohibited by pollution control laws. As a result still further treatment of the aqueous phase is required before the water itself may be discarded.

The ultrafiltration process of this invention can reduce the volume of the oil-dirt-water phase by as much as a factor of five to thirty or higher depending on the oil content of the starting material. Thus, the volume of material requiring further treatment for disposal is greatly reduced. Further, because the oil level in this concentrate phase may typically be brought to a level of 20 to 40 per cent, which is a high enough level to typically sustain combustion without additional fuel being added, the disposal problem can be greatly simplified by burning. This also permits the recovery of the bulk of the heating energy of the oil.

The oil-free aqueous phase may be rejected into a sewer or recycled back into the process. The reuse of the water promotes closed cycle operation, highly desirable from the water conservation standpoint. In addition, where there are valuable water soluble substances, such as detergents, which are carried through with the filtrate, an operating economy is realizable by avoiding the loss of these materials in the usual waste stream.

Another major advantage accruing from the use of the process of the invention to continuously remove the dirt and oil from a metal washer on a paint line, for example, is that the cleaner washer liquid improves the cleanliness of the following rinse and other commonly used pre-paint processing baths. As a result, the quality of the paint coating on the cleaner metal part may be improved considerably.

A further embodiment of the present invention is directed to the ultrafiltration module itself and to methods for assembling the tubular members. Although even a single tubular member can effect concentration and separation, it is, or course, more practical to construct a module having a multiplicity of tubes. The number of tubular members employed will vary depending upon a variety of factors. Modules containing as few as 25 or less, or up to 1000 or more tubular members have been constructed.

As indicated in FIG. 2, the tubular members are aligned in a parallel fashion and in close proximity to one another. Each tubular member is held in place by tube sheets 34 and 36. The tube sheets themselves are mounted in the module so as to provide a permeate zone 38 which is sealed from feed fluid entering the entrance port via conduit 26. The only liquid which can enter the permeate zone is that which filters through the walls of the tubular members.

The outer shell of the module and the tube sheets can be fabricated from a variety of materials. For example, a wide variety of plastics, such as polyvinyl chloride and the like, or metals such as stainless steel can be used. Due to the wide variety of liquids which can be treated and temperature variations of the feed streams, it is preferred to construct the module of stainless steel or other material which is compatible with the feed liquid and operating conditions.

As hereinbefore indicated, FIGS. 3 and 4 illustrate two types of methods for assembling the tubular members in the tube sheets so that a liquid-tight seal is obtained. In both instances the ends of the tubular members are sealed and cushioned by a rubber or rubberlike seal. As opposed to a cemented or other fixed sealing means, the assembly method employed in this invention provides somewhat of a floating seal so that brittle tubular members, for example, those composed of carbon, can withstand a certain amount of shock.

The assembly shown in FIG. 3, utilizes O rings 46 which are fitted over the ends of the tubular members. The plate 48 is then placed over the tube ends and O rings. When the cap 50 is attached to end sheet 42 the O rings are compressed, sealing and securing the tubular members in place.

FIGS. 4–6 illustrate a more preferred assembly of the tubular members in the ultrafiltration module. As shown in FIG. 6, the end sheet 34 contains openings of sufficient diameter to admit the tubular members. The surface of the end sheet opposite the permeate zone is recessed to permit a gasket seal 52 to be placed over the end of the tube and forced into the recessed area. This seals and secures the tubular members in place. An advantage of this type of assembly over the previous one is that it permits the tubular members to be aligned in very close proximity to one another. For certain applications and due to space requirements it may be advantageous to fabricate a relatively compact module without sacrificing the desired number of tubular members.

For the most efficient utilization of the ultrafiltration apparatus of this invention it is often preferred to operate a closed loop system, that is, the feed stream after passing through the module where it becomes slightly more concentrated with the larger molecular weight molecules, is recycled back to the module. As the liquid increases to a sufficient concentration, it can then be drawn off from the system. A variety of automatic control means can be utilized in removal of concentrate as well as circulating the feed stream.

Although FIG. 1 illustrates an ultrafiltration apparatus employing a single module 10, for certain applications it may be desirable to use two or more modules in the same apparatus. In such instances, the modules can be arranged in series, i.e., the concentrate from a first module serving as the feed stream to a second, and so on, or in parallel wherein the same feed stream simultaneously enters all modules. A variety of factors can influence which arrangement will optimize the concentration and separation of components for a particular application.

Due to the excellent features of the apparatus of this invention, it is ideally suited for the separation and concentration of components contained in a wide variety of liquids. As previously indicated, a particularly attractive application of the ultrafiltration apparatus of this invention is in the concentration and separation of oil-water emulsions. Such emulsions are encountered in a wide variety of metal-working and metal-washing operations. Prior to the present invention there was no satisfactory method for concentrating such liquids efficiently in order to minimizing waste disposal and reclaimed many of the useful components in the liquids. However, the apparatus of this invention has been outstandingly successful in the treatment of a wide variety of liquids which contain emulsified and/or chemically stabilized oil.

As demonstrated in the examples, the ultrafiltration apparatus is also useful for the concentration and separation of solutions employed in textile operations. For example, polyvinyl alcohol is readily concentrated and separated from textile sizing solutions with a high degree of efficiency.

The apparatus is also useful for recovering and recycling detergents from a variety of wash waters, such as car washes, laundries, and the like.

It has also been noted that the ultrafiltration apparatus of this invention is useful in electrophoretic coating operations. For example, after a painted article is removed from an electro-painting bath in many instances it is sprayed with water to remove excess drag-out. By passing this wash water containing paint through the apparatus of this invention paint solids can be concentrated and returned to the paint bath. The apparatus is also useful in removing excess water, soluble salts, or excess solubilizers from the paint bath. As indicated in Example 6, the rejection of the pigment phase can be as high as 99.95 per cent. In contrast to methods disclosed in the prior art such as, for example, in U.S. Pat. No. 3,663,399, the permeation rates obtained with the apparatus of this invention are much higher.

Additionally the apparatus of this invention has been found to be useful in the treatment of a variety of food and beverage products. For instance, the apparatus is useful in the concentration and separation of spent grain liquors in the preparation of beer and ale. It has also been found to be useful in concentrating proteins from cheese whey, clarification of vinegar, and the like.

In certain applications such as in the desalinization of sea water, the ultrafiltration apparatus can be employed as an initial step to clarify the water prior to its passage through a reverse osmosis unit.

It has also been observed that the ultrafiltration apparatus is useful for the concentration and separation of bovine animal blood serum, egg albumin, enzymes and the like.

The following examples are illustrative:

EXAMPLE 1

An aqueous solution (solution A) containing approximately 2 per cent by weight of tramp and soluble oils with about 3 per cent by weight of soluble industrial detergent and caustic soda was circulated through an ultrafiltration module at various pressures and flow velocities. The waste itself came from the holding tank for an industrial washer which is used to clean the dirt, metal chips and remnants of oil from the metal parts after they are fabricated. Various oils are on the finished parts including lubricating oils used for the drawing operation, soluble oils from the shaping operation, and various cutting oils from the machining operation. The concentration of total oil in the feed material was determined by sulfuric acid addition and subsequent separation.

The operating conditions and results obtained are set forth in Table I below:

Table I

Operating Conditions of Ultrafiltration System for Processing Oil-Water-Detergent Solution A

| | |
|---|---|
| Operating pressure | 100 psi |
| Circulation velocity | 18 ft/sec |
| Filtrate flux | 90 GFD (gallons per square foot per day) |
| Operating temperature | 140°F |
| Total Operating time | 30 hours |

Characteristics of Feed, Filtrate and Concentrate

| | Feed | Filtrate | Concentrate |
|---|---|---|---|
| pH | 12.5 | 12.5 | 12.5 |
| Oil content | 2% | <100 ppm | 16% |
| Detergent content | 3% | 3% | 3% |

As is evident from the Table there was an eight-fold concentration of the feed. The filtrate had less than 100 ppm of oil but still had the same detergent concentration as the feed making it suitable for reuse.

EXAMPLE 2

A second oil-water-detergent solution (solution B) was tested in which the main oil constituent consisted of the soluble oil used in a metal stamping operation; the detergent phase was identified as Amchem 1001. In this case the feed stream contained about 0.4% of oil by volume as determined by sulfuric acid separation. Operating characteristics and characteristics of the feed, filtrate and concentrate are indicated in Table II below. Flux values greater than 100 GFD were measured over operating periods greater than 30 days at various concentrations of oil. A 55-fold concentration was achieved.

Table II

Characteristics of Ultrafiltration System
for Processing Oil-Water-Detergent Solution B

| | |
|---|---|
| Operating pressure | 100 psi |
| Circulation velocity | 15 ft/sec |
| Operating temperature | 150°F |
| Filtrate flux | 114 GFD |
| Total operating time | 720 hours |

Characteristics of Feed, Filtrate and Concentrate

| | Feed | Filtrate | Concentrate |
|---|---|---|---|
| pH | 9.5 | 9.5 | 9.5 |
| Oil content | 0.4 | <100 ppm | 22% |
| Detergent content | 3% | 3% | 3% |

EXAMPLE 3

In a third experiment Texaco Soluble Oil type C was run in a single tube system at a feed concentration of about 5 per cent. Data of Table III indicate operating characteristics for a 30-hour run, during which time the concentration of oil was increased from 5 per cent to 20 per cent.

Table III

Operating Conditions of Ultrafiltration System for Processing Texaco-C Oil/Water Emulsion

| | |
|---|---|
| Operating pressure | 100 psi |
| Circulation velocity | 22 ft/sec |
| Average filtrate flux | 138 GFD |
| Average operating temperature | 130°F |
| Total operating time | 24 hours |

Characteristics of Feed, Filtrate and Concentrate

| | Feed | Filtrate | Concentrate |
|---|---|---|---|
| Oil Content | 5% | <100 ppm | 29% |

EXAMPLE 4

To illustrate the versatility of the ultrafiltration system for various other industrial wastes, samples of polyvinyl alcohol-water solutions were run at concentrations of 1.0 to 4.0 per cent. Data of Table IV indicate the operating characteristics of the system and the properties of feed, filtrate and concentrate. The polyvinyl alcohol was within the molecular size range 50,000–100,000 such as used in a textile sizing bath. In this case a particulate bed coating of zirconia was covered with a second coating of a hydrous zirconium oxide gel. The hydrous zirconium oxide was prepared by boiling a 0.25 M $ZrOCl_2$ solution for 30 hours to hydrolyze the oxy-chloride. For the 37 inch long, ¼ in. I.D. tube, 12.5 milliliters of this stock solution was added to 3 liters of distilled water to produce the feed which was fed through the tube at 100 psi for approximately an hour, with the permeate being returned to the reservoir, to deposit the hydrous gel on top of the previous coating. In use, the apparatus provided greater than 97 per cent rejection of the polyvinyl alcohol.

Table IV

Operating Conditions of Ultrafiltration System with Polyvinyl Alcohol Solution

| | | |
|---|---|---|
| Operating Pressure | | 100 psig |
| Circulation velocity | | 20 ft/sec |
| Average filtrate flux | at 1% concentration | 70 GFD |
| | at 4% concentration | 21 GFD |
| Average operating temperature | | 180°F |
| Total operating time | | 112 hours |

Characteristics of Feed, Filtrate, Concentrate

| | Feed | Filtrate | Concentrate |
|---|---|---|---|
| pH | 6.8 | 6.8 | 6.8 |
| PVA | 1% | 0.03% | 4% |

EXAMPLE 5

Comparison experiments in the concentration of polyvinyl alcohol were performed with carbon tubes uncoated, with carbon tubes coated with a particulate bed, and with carbon tubes coated with a particulate bed plus the hydrous zirconia. All measurements were performed at 100 psi inlet pressure and flow velocity near 20 fps. Data of Table V indicate comparative rejection and flux characteristics for the three experiments, showing the greatly improved flux afforded by the zirconia particle and the improved rejection with sustained high flux when the hydrous zirconia gel layer was added.

Table V

Comparison of Rejection and Flux Characteristics for Carbon Tube Permeator, Carbon Tube-Particulate Bed Permeator, Carbon Tube - Particulate Bed - Hydrous Metal Oxide Permeator Using 1% PVA Solution as Feed

| | Flux (GFD) | Rejection (%) | Temp. (°F) |
|---|---|---|---|
| Carbon tube alone | 15 | 0–50 | 134 |
| Carbon tube - particulate | 100 | 63–66 | 188 |
| Carbon tube - particulate - hydrous metal oxide | 100 | 97–99 | 177 |

EXAMPLE 6

The ultrafiltration apparatus of this invention was employed for the concentration of a primer paint from an electrodeposition system. A porous carbon tube with a pore volume of about 0.2 g/cc and the majority of the pores in the 0.1 to $1.0\mu$ diameter range, as determined by Hg porosimetry, was coated with 6 mg/cm² of precursor $ZrO_2$ particles, sized in the 0.1 to $1.0\mu$ range by centrifuging. The coating was performed by adding the $ZrO_2$ to about 3 liters of acidified water and circulating the water through the interior of the tube at 100 psi for 1 hour while the water permeating through the tube wall was returned to the circulating feed. The tube was then inserted in a circulation system in which a 7½% solid solution of an electrodepositable paint, Forbes 2000, was fed at 100 psi and 80°F through the tube at a linear flow velocity of 15 to 25 ft/sec. Over a 214 hour period, the permeation rate held between 85 and 100 (GFD). In other experiments with this paint and this tube extending over 412 more hours, the flux held between 50 and 65 GFD. Rejection of the pigment phase was 99.95% and of the ionic constituents, was 48.8%. Typical permeation rates for film type ultrafiltration systems on this type of paint is 10=30 GFD.

EXAMPLE 7

In another example in which a different type of high porosity, high surface area powder was used as a precoat, a slurry of γ-alumina, ground in size to approximately the same range as the precursor zirconia, that is, from 0.1 to $1.0\mu$ was used. The carbon tube was of the same type as in the previous example. Its flux at 100 psi with pure water was over 400 GFD at 110°F. With the pre-coat applied it had dropped at 280 GFD at an operating temperature of 160°F. This tube was used to process a sample of the black liquor from wood pulp digestion. Fluxes of the order of 70 to 80 GFD were obtained with color rejection greater than 90% and about 30% rejection of the ionic constituents.

All measurements were made using standard techniques for the determination of pore volume, pore diameter, air and water flow rates and bulk densities.

Table VI

POROSITY CHARACTERISTICS OF UNCOATED TUBULAR MEMBERS

| Sample Number | Total Pore Volume cc/g | Pore Volume in Peak cc/g | Pore Diameter of Peak, $\mu$ From | To | Pore Volume 0.1–0.5 $\mu$ cc/g | 1 $\mu$ cc/g | Air Perm. at 10 psi cc/min cm² | Water Flow at 100 psig 1 Min. GFD | 5 Min. GFD | Bulk Density g/cm³ |
|---|---|---|---|---|---|---|---|---|---|---|
| 1 | 0.20 | 0.16 | 0.18 | 0.39 | 0.16 | 0.036 | 13 | 550 | 556 | 1.39 |
| 2 | 0.20 | 0.16 | 0.19 | 0.44 | 0.16 | 0.031 | 13 | — | — | 1.39 |
| 3 | 0.19 | 0.15 | 0.2 | 0.5 | 0.14 | 0.038 | — | — | — | — |
| 4 | 0.13 | 0.13 | 0.2 | 0.8 | 0.11 | 0.01 | — | — | — | 1.53 |
| 5 | 0.13 | 0.09 | 0.2 | 0.5 | 0.06 | 0.04 | 6 | 320 | 240 | 1.51 |
| 6 | 0.12 | 0.08 | 0.3 | 0.5 | 0.05 | 0.05 | 11 | 450 | 328 | 1.50 |
| 7 | 0.14 | 0.11 | 0.7 | 1.8 | 0.001 | 0.05 | 179 | — | — | 2.55 |
| 8 | 0.15 | 0.06 | 7.1 | 88 | 0.004 | 0.11 | 13 | 700 | 215 | 1.66 |
| 9 | 0.135 | 0.10 | 2.2 | 12 | 0.004 | 0.13 | 30 | 2100 | 212 | 1.61 |
| 10 | 0.135 | 0.10 | 2.4 | 12 | 0.005 | 0.11 | — | 1890 | 140 | 1.65 |
| 11 | 0.13 | 0.10 | 3.1 | 12 | 0.003 | 0.11 | 34 | 1400 | 216 | 1.63 |
| 12 | 0.125 | 0.08 | 7.4 | 12 | 0.01 | 0.11 | 47 | 2300 | 336 | 1.64 |
| 13 | 0.12 | 0.07 | 2.9 | 12 | 0.003 | 0.10 | 25 | 1200 | 500 | 1.67 |
| 14 | 0.11 | 0.07 | 8.8 | 12 | 0.001 | 0.10 | 22 | 800 | 128 | 1.66 |
| 15 | 0.07 | 0.04 | 1 | 12 | 0.002 | 0.04 | 25 | 2000 | 550 | 1.67 |

EXAMPLE 8

In another experiment with the paper mill black liquor, a carbon tube as above was coated first with the particulate zirconia and then with the hydrous zirconia oxide from the ZrOCl₂ solution as indicated in example 4. After running the black liquor overnight at 100 psi and 140°F, the permeation rate was 80 GFD with greater than 90% rejection of the color. The feed had a conductivity of 32,000 mhos while the permeate had a conductivity of approximately 17,000 mhos, indicating an ionic rejection of the order of 47%.

EXAMPLE 9

A comparison was made on a (number of carbon and alumina tubes to demonstrate the wide variety in characteristics which are related to pore diameter, pore volume and air and water permeability. As indicated previously, tubular members having a pore diameter of from about 0.1 to about 2.0 microns, such as sample numbers 1–7 of Table VI, have been found to provide optimum concentration and separation of components from liquids.

Those tubular members having pore diameters generally larger than about 2.0 microns (sample number 8–15) tended to plug the pores in depth with the metal oxide particles and ultrafiltered materials in the retentate and give undesirably low permeation rates. Additionally, when the bulk of the pore volume had pore diametes less than about 0.1 micron the water flow rate of the uncoated tube was too low and therefore the permeation rate was unacceptably low. In contrast sample numbers 1–7 having a pore volume in the distribution peak of about 0.08 cubic centimeters per gram of greater, in the pore diameter range primarily of from about 0.1 to about 2.0 microns gave excellent results. Such carbon tubes are also distinguished by having a bulk density of less than about 1.60 grams per cubic centimeters.

Sample Number 7 was a useful tubular member composed of alumina whereas the others were composed of carbon.

EXAMPLE 10

The ultrafiltration apparatus of this invention was also employed for the concentration and separation of the protein fraction of cottage cheese whey from the bulk of the water, lactose and dissolved salts. Porous carbon tubes with pore volumes within the preferred range previously indicated were coated with a precursor magnesium-aluminum spinel in a manner similar to that of Example 6. A feed solution with 90 per cent of the liquid phase extracted was passed through the apparatus at 120°F for 20 hours keeping essentially all of the protein in the concentrate. The permeation rate at the end of the run was 60 GFD. The tubes were cleaned with distilled water and a new feed solution passed through the apparatus. After 6.5 hours of operation the permeation rate dropped from 51 to 33 GFd. After washing with a Tergitol 15-S-5 wash the permeation rate of the feed solution returned to 57 GFD. The tubular members were then cleaned with the Tergitol wash and purged with steam at 8 psig. to sterilize the tubes and remove particulate matter.

A new feed solution was fed to the apparatus and the initial permeation rate was 63 GFD. After 2 hours of continuous operation the permeation rate was 51 GFD and after 24 hours, 36 GFD. It was therefore evident that the tubular member and metal oxide coating could be cleaned and sterilized with steam to return the performance to a high level.

Although the invention has been illustrated by the preceding examples it is not to be construed as being limited to the materials employed therein, but rather, the invention relates to the generic area as hereinbefore disclosed. Various modifications and embodiments can be made without departing from the spirit and scope thereof.

What is claimed is:
1. An ultrafiltration apparatus having improved resistance to clogging for the concentration and separation of components contained in liquids, said apparatus comprised of, in combination:
   a. at least one module having
      i. at least one entrance port,
      ii. at least one exit port, iii. a permeate collection zone, having at least one exit port, iv. a multiplicity of axially aligned hollow tubular members disposed in said zone in close proximity to one another, said members having a pore volume of at least about 0.08 cc/gm in the distribution peak in the pore diameter range wherein the majority of the pores are from about 0.1 to about 2.0 microns in diameter, said members being supported and sealably mounted in said zone so that liquid entering said module must contact said members and any components of said liquid which permeate the walls of said members collect in said permeate collection zone, and v. contained on the surface of said members which is in direct contact with said liquid a substantially uniform continuous adherent porous coating of preformed aggregates of metal oxide particles, said aggregates of particles having an average mean size of less than 5.0 microns, said coating being from about 0.01 to about 10.0 microns in thickness without substantial penetration into said members, b. means for supplying a feed liquid to said module, c. means for withdrawing a concentrated liquid from said module, and d. means for withdrawing a permeate liquid from said permeate collection zone.

2. The apparatus of claim 1 having conduit means connected to the exit port and the entrance port of said module, whereby said concentrated liquid is recycled through said module.

3. The apparatus of claim 2 having means connected to said conduit means whereby at least a portion of said concentrated liquid is withdrawn.

4. The apparatus of claim 1 having two or more modules disposed so that said feed liquid passes through said modules sequentially.

5. The apparatus of claim 1 having two or more modules disposed so that said feed passes through said modules simultaneously.

6. The apparatus of claim 1 wherein said tubular members have a length to diameter ratio of at least about 20 to 1.

7. The apparatus of claim 1 wherein said tubular members have an internal diameter of from about 0.10 inch to about 1.0 inch.

8. The apparatus of claim 1 wherein said tubular members have average pore diameters, at least 50 per cent of which are within the range of from about 0.1 to about 0.50 microns.

9. Th apparatus of claim 1 wherein said tubular members are composed of carbon.

10. The apparatus of claim 1 wherein said tubular members are composed of alumina.

11. The apparatus of claim 1 wherein said tubular members are composed of alumino silicate.

12. The apparatus of claim 1 wherein said aggregates of metal oxide particles have an average mean size of from about 0.1 to about 1.0 microns.

13. The apparatus of claim 1 wherein said coating is comprised of a precoat of aggregates of metal oxide particles having an average mean size of from about 0.1 to about 1.0 microns, and a second coating of metal oxide particles having an average mean particle size of less than about 0.1 microns.

14. The apparatus of claim 1 wherein said coating is comprised of a precoat of aggregates of metal oxide particles having an average size of from about 0.1 to about 1.0 microns, and a second coating of hydrous zirconia.

15. A process for the concentration and separation of polyvinyl alcohol from textile liquids containing said polyvinyl alcohol which comprises supplying said liquid containing polyvinyl alcohol to the ultrafiltration apparatus of claim 14 and withdrawing a liquid concentrated with polyvinyl alcohol from said apparatus.

16. The apparatus of claim 1 wherein said metal oxide is zirconia.

17. The apparatus of claim 1 wherein said metal oxide is gamma alumina.

18. The apparatus of claim 1 wherein said metal oxide is magnesium-alumina spinel.

19. A process for the concentration and separation of oil from liquids containing said oil which comprises supplying said liquid containing said oil to the ultrafiltration apparatus of claim 1 and withdrawing a liquid concentrated with oil from said apparatus.

20. A process for the concentration and separation of oil from liquids containing said oil and detergents which comprises supplying said oil and detergents to the ultrafiltration apparatus of claim 1 and withdrawing a liquid concentrated with oil from said apparatus.

21. A process for the concentration and separation of emulsified oil from liquids containing said emulsified oil which comprises supplying to the ultrafiltration apparatus of claim 1 and withdrawing a liquid concentrated with oil from said apparatus.

22. A process for the concentration and separation of polyvinyl alcohol from textile liquids containing said polyvinyl alcohol which comprises supplying said liquid containing polyvinyl alcohol to the ultrafiltration apparatus of claim 1 and withdrawing a liquid concentrated with polyvinyl alcohol from said apparatus.

23. A process for the separation of a low paint pigment permeate from electropainting bath liquids containing said paint pigment which comprises supplying said liquid containing said paint pigment to the ultrafiltration apparatus of claim 1 and withdrawing a a low paint pigment permeate from said apparatus.

24. A process for the concentration and separation of black liquor from liquids containing paper pulp which comprises supplying to the ultrafiltration apparatus of claim 1 said liquid containing said black liquor and withdrawing a liquid concentrated with black liquor from said apparatus.

25. A process for the separation of a permeate low in solids and proteins from spent grain liquors which comprises supplying liquid containing said spent grain liquors to the ultrafiltration apparatus of claim 1 and withdrawing a permeate low in solid and proteins from said apparatus.

26. A process for the concentration and separation of the protein fraction of cottage cheese whey from the bulk of the liquid containing water, lactose, and dissolved salts which comprises supplying said liquid containing said protein to the ultrafiltration apparatus of claim 1 and withdrawing a liquid concentrated with said protein fraction from said apparatus.

27. A module, useful in an ultrafiltration apparatus for the concentration and separation of components contained in liquids, said module having improved resistance to clogging comprised of in combination:

i. at least one entrance port, ii. at least one exit port, iii. a permeate collection zone, having at least one exit port, iv. a multiplicity of axially aligned hollow tubular members disposed in said zone in close proximity to one another, said members having a pore volume of at least about 0.08 cc/gm in the distrbution peak in the pore diameter range wherein the majority of the pores are from about 0.1 to about 2.0 microns in diameter, said member being supported and sealably mounted in said zone so that liquid entering said module must pass through the interior of said members and any components of said liquid which permeate the walls of said members collect in said permeate collection zone, and v. contained on the surface of said members a substantially uniform continuous adherent porous coating of preformed aggregates of metal oxide particles, said aggregates of particles having an average mean size of less than 5.0 microns, said coating being from about 0.01 to about 10.0 microns in thickness without substantial penetration into said members.

28. The module of claim 27 wherein said tubular members have a length to diameter ratio of at least about 20 to 1.

29. The module of claim 27 wherein said tubular members have an internal diameter of from about 0.10 inch to about 1.0 inch.

30. The module of claim 27 wherein said tubular members have average pore diameters, at least 50 per cent of which are within the range of from about 0.1 to about 0.50 microns.

31. The module of claim 27 wherein said tubular members are composed of carbon.

32. The module of claim 27 wherein said tubular members are composed of alumina.

33. The module of claim 27 wherein said tubular members are composed of alumino silicate.

34. The module of claim 27 wherein said aggregates of metal oxide particles have an average mean size of from about 0.1 to about 1.0 microns.

35. The module of claim 27 wherein said coating is comprised of a precoat of aggregates of metal oxide particles having an average mean size of from about 0.1 to about 1.0 microns, and a second coating of metal oxide particles having an average mean particle size of less than about 0.1 microns.

36. The module of claim 27 wherein said coating is comprised of a precoat of aggregates of metal oxide particles having an average mean size of from about 0.1 to about 1.0 microns and a second coating of hydrous zirconia.

37. The module of claim 27 wherein said metal oxide is zirconia.

38. The module of claim 27 wherein said metal oxide is gamma alumina.

39. The module of claim 27 wherein said metal oxide is magnesium-alumina spinel.

40. A process for sealably mounting and supporting said tubular members in the module of claim 27 which process comprises inserting each end of said tubular members through end sheets having a multiplicity of openings of a slightly larger diameter than the tubular member themselves, so that at least a portion of said members protrude beyond the outer surface of said end sheets, the outer surface portion of said end sheets having openings which are recessed, inserting a ring shaped expandable gasket having a normal diameter less than that of said members, over the ends of said members, and compressing said gasket into the recessed openings of said end sheets.

41. The process of claim 40 wherein said tubular members are composed of carbon.

42. The process of claim 40 wherein said gasket is composed or rubber.

43. The process of claim 40 wherein said gasket is composed of a synthetic rubber-like material.

44. A process for sealably mounting and supporting said tubular members in the module of claim 27 which process comprises inserting each end of said tubular members through end sheets having a multiplicity of openings of a slightly larger diameter than the tubular members themselves, so that at least a portion of said members protrude beyond the outer surface of said end sheets, inserting O-rings over the ends of said members and securing said O-rings to said end sheets.

45. The process of claim 44 wherein said tubular members are composed of carbon.

46. The process of claim 44 wherein said O-rings are composed of rubber.

47. A process for coating the tubular member of the module of claim 27 which comprises contacting the inner surface of said tubular members with an aqueous suspension of said aggregates of metal oxide particles until said coating is of a thickness of at least about 0.01 to about 10.0 microns and a weight of at least about 1.0 milligrams per square inch of the surface area of said members.

48. A process for coating the tubular member of the module of claim 27 which comprises contacting the outer surface of said tubular members with an aqueous suspension of said aggregates of metal oxide.

* * * * *